US012759127B2

(12) United States Patent
Daily et al.

(10) Patent No.: US 12,759,127 B2
(45) Date of Patent: Oct. 13, 2026

(54) POWER TOOL WITH TORQUE CONTROLLING ACCESSORY

(71) Applicant: MILWAUKEE ELECTRIC TOOL CORPORATION, Brookfield, WI (US)

(72) Inventors: Paul F. Daily, Waukesha, WI (US); Benjamin J. Farley, Milwaukee, WI (US); Levi D. Speckman, Elkhorn, WI (US); Daniel R. Ertl, Kewaskum, WI (US); Mitchell G. Menard, Chicago, IL (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/477,714

(22) Filed: Sep. 29, 2023

(65) Prior Publication Data

US 2024/0109175 A1 Apr. 4, 2024

Related U.S. Application Data

(60) Provisional application No. 63/412,023, filed on Sep. 30, 2022.

(51) Int. Cl.
*B25F 5/02* (2006.01)
*B25F 5/00* (2006.01)

(52) U.S. Cl.
CPC .............. *B25F 5/026* (2013.01); *B25F 5/001* (2013.01)

(58) Field of Classification Search
CPC ................................. B25F 5/001; B35F 5/026
USPC .......................................................... 173/216
See application file for complete search history.

(56) References Cited

U.S. PATENT DOCUMENTS

| | | | |
|---|---|---|---|
| 3,651,391 | A | 3/1972 | Vogelsberg |
| 4,029,996 | A | 6/1977 | Miffitt |
| 4,493,377 | A | 1/1985 | Gunther et al. |
| 5,353,468 | A | 10/1994 | Yap et al. |
| 5,453,644 | A | 9/1995 | Yap et al. |
| 5,583,386 | A | 12/1996 | Meixner et al. |
| 6,307,182 | B1 | 10/2001 | Lile |

(Continued)

FOREIGN PATENT DOCUMENTS

| | | | |
|---|---|---|---|
| CN | 201346602 | Y | 11/2009 |
| CN | 201970292 | U | 9/2011 |

(Continued)

OTHER PUBLICATIONS

AMS, "AS8579 Capacitive Sensor," <https://ams.com/en/as8579> web page visited Aug. 23, 2023 (4 pages).

(Continued)

*Primary Examiner* — Nathaniel C Chukwurah
(74) *Attorney, Agent, or Firm* — Michael Best & Friedrich LLP

(57) ABSTRACT

A power tool includes a housing, a drive mechanism supported within the housing, a spindle operatively coupled to an output of the drive mechanism such that torque from the drive mechanism rotates the spindle about an axis, and an accessory removably coupled to the housing. The drive mechanism is configured to supply up to a first maximum torque to the spindle when the accessory is removed from the housing. The drive mechanism is configured to supply up to a second maximum torque to the spindle greater than the first maximum torque when the accessory is coupled to the housing.

20 Claims, 7 Drawing Sheets

(56) References Cited

U.S. PATENT DOCUMENTS

| | | | | |
|---|---|---|---|---|
| 6,651,608 | B2 | 11/2003 | Steffen | |
| 6,692,864 | B1 | 2/2004 | Dansui et al. | |
| 6,731,503 | B2 | 5/2004 | Privett et al. | |
| 6,920,047 | B2 | 7/2005 | Privett et al. | |
| 7,034,552 | B2 | 4/2006 | Kirchner et al. | |
| 7,722,435 | B2 | 5/2010 | King | |
| 7,795,882 | B2 | 9/2010 | Kirchner et al. | |
| 7,836,968 | B2 | 11/2010 | Steverding et al. | |
| 7,982,624 | B2 | 7/2011 | Richter et al. | |
| 7,999,562 | B2 | 8/2011 | Khapochkin et al. | |
| 8,230,942 | B2 | 7/2012 | Steverding et al. | |
| 8,257,227 | B2 | 9/2012 | Brand et al. | |
| 8,353,362 | B2 | 1/2013 | Liebhard et al. | |
| 8,371,708 | B2 * | 2/2013 | Nagasaka | B25B 23/18 173/217 |
| 8,410,645 | B2 | 4/2013 | Lau | |
| 8,415,842 | B2 | 4/2013 | Lau | |
| 8,493,074 | B2 | 7/2013 | Unterreitmayer et al. | |
| 8,803,377 | B2 | 8/2014 | Lau | |
| 8,833,485 | B2 | 9/2014 | Svennung et al. | |
| 9,124,145 | B2 | 9/2015 | Lau | |
| 9,138,846 | B2 | 9/2015 | Svennung et al. | |
| 9,141,174 | B2 | 9/2015 | Unterreitmayer et al. | |
| 9,236,860 | B2 | 1/2016 | Unterreitmayer et al. | |
| 9,367,062 | B2 | 6/2016 | Volpert | |
| 9,914,204 | B2 | 3/2018 | Hosking | |
| 10,039,239 | B2 | 8/2018 | Brand et al. | |
| 10,091,947 | B2 | 10/2018 | Pellenc | |
| 10,486,291 | B2 | 11/2019 | Bartoszek | |
| 10,695,943 | B2 | 6/2020 | Kachi et al. | |
| 10,845,772 | B2 | 11/2020 | Yang et al. | |
| 10,882,123 | B2 | 1/2021 | Brewster et al. | |
| 11,139,722 | B2 | 10/2021 | Velderman et al. | |
| 11,192,195 | B2 | 12/2021 | Crabb et al. | |
| 11,221,663 | B2 | 1/2022 | Stanzani et al. | |
| 11,298,763 | B2 | 4/2022 | Crabb et al. | |
| 11,446,841 | B2 | 9/2022 | Kachi et al. | |
| 12,097,604 | B2 * | 9/2024 | Kamiya | B25F 5/00 |
| 2005/0161241 | A1 | 7/2005 | Frauhammer et al. | |
| 2005/0249564 | A1 * | 11/2005 | Van Bergen | B25F 5/026 408/241 R |
| 2009/0000128 | A1 | 1/2009 | Kaiser et al. | |
| 2010/0018609 | A1 | 1/2010 | Van Der Linde et al. | |
| 2011/0248932 | A1 | 10/2011 | Wu et al. | |
| 2013/0162188 | A1 * | 6/2013 | Koeder | B23B 45/001 318/434 |
| 2014/0165946 | A1 | 6/2014 | Yanagihara et al. | |
| 2014/0231113 | A1 * | 8/2014 | Steurer | B25F 5/00 173/1 |
| 2020/0212505 | A1 | 7/2020 | Nakano et al. | |
| 2021/0283759 | A1 | 9/2021 | Merget et al. | |
| 2021/0288489 | A1 | 9/2021 | Inam et al. | |
| 2022/0048123 | A1 | 2/2022 | Crabb et al. | |
| 2022/0077750 | A1 | 3/2022 | Velderman et al. | |
| 2022/0129059 | A1 | 4/2022 | Stanzani et al. | |
| 2023/0060201 | A1 | 3/2023 | Koschel et al. | |
| 2023/0139444 | A1 | 5/2023 | Kok et al. | |
| 2023/0170902 | A1 | 6/2023 | Koschel et al. | |
| 2023/0173653 | A1 | 6/2023 | Kok | |
| 2023/0238957 | A1 | 7/2023 | Koschel et al. | |

FOREIGN PATENT DOCUMENTS

| | | | |
|---|---|---|---|
| CN | 206296780 | U | 7/2017 |
| CN | 108838437 | A | 11/2018 |
| CN | 109211282 | A | 1/2019 |
| CN | 208592420 | U | 3/2019 |
| CN | 208788514 | U | 4/2019 |
| CN | 209077860 | U | 7/2019 |
| CN | 110140154 | A | 8/2019 |
| CN | 111098256 | A | 5/2020 |
| CN | 210848460 | U | 6/2020 |
| CN | 211709160 | U | 10/2020 |
| CN | 211867637 | U | 11/2020 |
| CN | 212094475 | U | 12/2020 |
| CN | 212169067 | U | 12/2020 |
| CN | 113290289 | A | 8/2021 |
| CN | 113305788 | A | 8/2021 |
| CN | 113878550 | A | 1/2022 |
| CN | 215545415 | U | 1/2022 |
| CN | 114505537 | A | 5/2022 |
| CN | 218659870 | U | 3/2023 |
| DE | 4344187 | A1 | 6/1995 |
| DE | 19913833 | A1 | 10/1999 |
| DE | 102007043035 | A1 | 3/2009 |
| DE | 102016214191 | A1 | 2/2018 |
| DE | 102018108068 | A1 | 10/2019 |
| DE | 102018251705 | A1 | 7/2020 |
| EP | 1440771 | A1 | 7/2004 |
| EP | 2329923 | A2 | 6/2011 |
| EP | 3495899 | A1 | 6/2019 |
| GB | 2598736 | A | 3/2022 |
| TW | 1554048 | B | 10/2016 |
| WO | 9618067 | A1 | 6/1996 |
| WO | 03061913 | A1 | 7/2003 |
| WO | 2008009624 | A1 | 1/2008 |
| WO | 2009092672 | A1 | 7/2009 |
| WO | 2020173487 | A1 | 9/2020 |
| WO | 2020250716 | A1 | 12/2020 |
| WO | 2021129978 | A1 | 7/2021 |
| WO | 2021192850 | A1 | 9/2021 |

OTHER PUBLICATIONS

DanEngineersStuff, "Turbo-Drill," <https://www.youtube.com/watch?v=TZJU3a2jYvE&t=293s> YouTube publication date: Aug. 31, 2018 (1 page).

* cited by examiner

POWER TOOL WITH TORQUE CONTROLLING ACCESSORY

CROSS-REFERENCE TO RELATED APPLICATIONS

This application claims priority to U.S. Provisional Patent Application No. 63/412,023, filed Sep. 30, 2022, the entire content of which is incorporated herein by reference.

BACKGROUND

The present invention relates to power tools and more particularly to power tools that may be used with auxiliary handles.

Power tool performance may be limited in order to avoid user injury. Safety regulations typically define a maximum torque that may be applied to a human wrist, based on distance between a grip or trigger of the power tool and a working axis of the power tool. Greater performance and torque may be permissible, however, if the power tool is provided with an auxiliary handle to facilitate two-handed operation of the power tool. An auxiliary handle typically provides greater leverage, allowing a user safely to absorb a greater amount of reaction torque and thereby deliver a greater amount of torque to a workpiece.

SUMMARY

The present invention provides, in one aspect, a power tool including a housing, a drive mechanism supported within the housing, a spindle operatively coupled to an output of the drive mechanism such that torque from the drive mechanism rotates the spindle about an axis, and an accessory removably coupled to the housing. The drive mechanism is configured to supply up to a first maximum torque to the spindle when the accessory is removed from the housing, and the drive mechanism is configured to supply up to a second maximum torque to the spindle greater than the first maximum torque when the accessory is coupled to the housing.

The present invention provides, in another aspect, a power tool including a housing, a drive mechanism supported within the housing, a spindle operatively coupled to an output of the drive mechanism such that torque from the drive mechanism rotates the spindle about an axis, an auxiliary handle removably coupled to the housing, a sensor supported by the auxiliary handle, and a controller in communication with the sensor. The controller is configured to determine if a user is grasping the accessory or if the user is not grasping the accessory based on feedback from the sensor. The controller is also configured to control the drive mechanism to supply up to a first maximum torque when the controller determines the user is not grasping the accessory and to supply up to a second maximum torque greater than the first maximum torque when the controller determines the user is grasping the accessory.

The present disclosure provides, in another aspect, a power tool including a housing, a drive mechanism supported within the housing, a spindle operatively coupled to an output of the drive mechanism such that torque from the drive mechanism rotates the spindle about an axis, an auxiliary handle removably coupled to the housing, a sensor supported by the housing, and a controller in communication with the sensor. The controller is configured to determine if the auxiliary handle is coupled to the housing or if the auxiliary handle is not coupled to the housing based on feedback from the sensor. The controller is also configured to control the drive mechanism to supply up to a first maximum torque when the controller determines the auxiliary handle is not coupled to the housing and to supply up to a second maximum torque greater than the first maximum torque when the controller determines the auxiliary handle is coupled to the housing.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The present disclosure provides, among other things, a power tool configured to vary a maximum torque output based on whether an accessory (e.g., an auxiliary handle) is coupled to the power tool. The power tool is able to provide a higher maximum torque output when the accessory is in place, and a lower maximum torque output when the accessory is removed, thereby abiding by safety regulations while still providing an operator with the option to use or remove the accessory.

Figure 1:
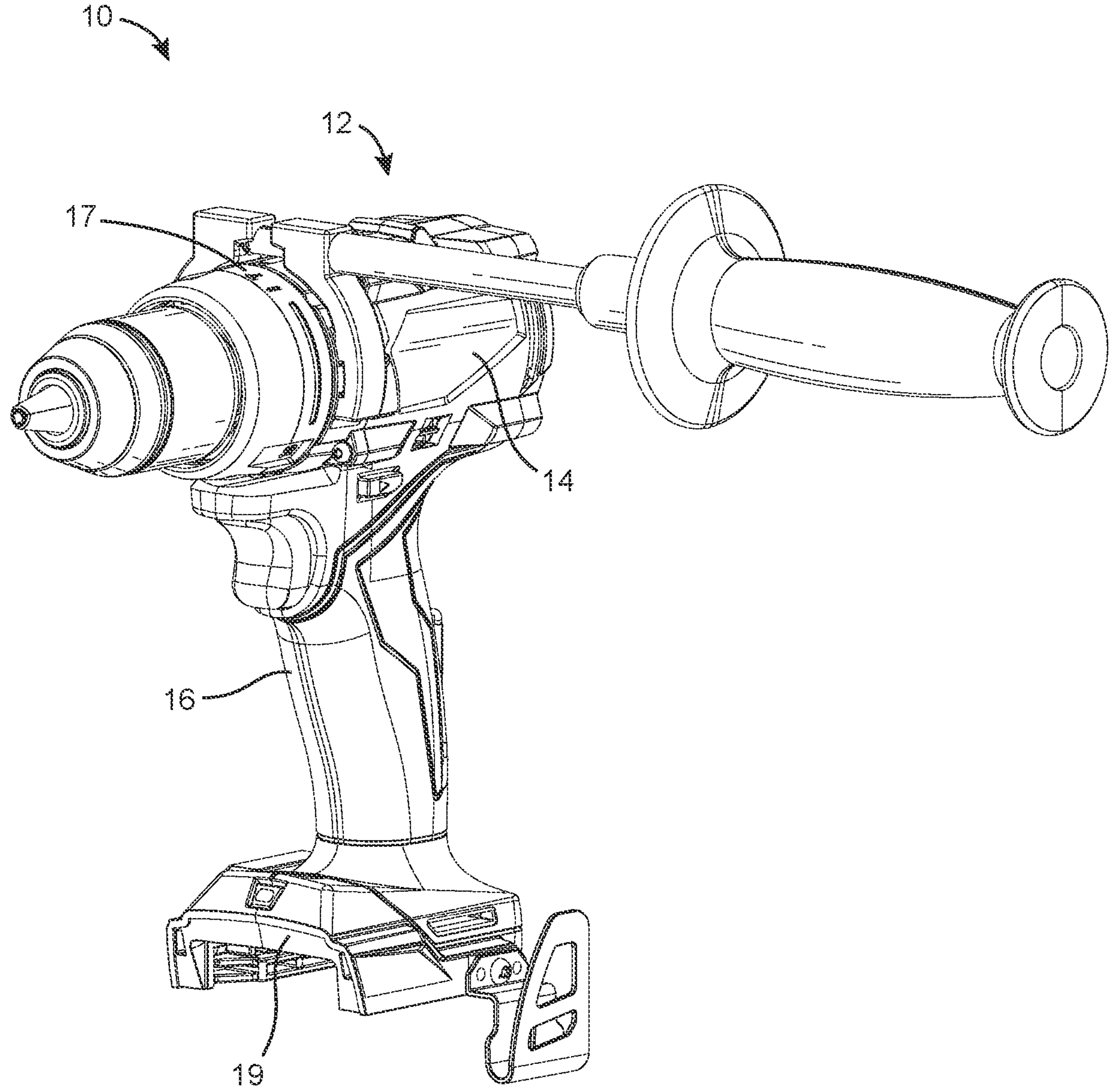
FIG. 1 is a perspective view of a power tool according to an embodiment of the present disclosure.

For example, FIG. 1 illustrates a power tool 10 in the form of a drill. The power tool 10 includes a housing 12 having a motor housing portion 14, a handle portion 16 extending from the motor housing portion 14, and a front housing portion or gear case 17 coupled to a front side of the motor housing portion 14. A battery receptacle 19 is located at the bottom end of the handle portion 16 and is configured to receive a battery (e.g., a rechargeable power tool battery pack; not shown).

Figure 2:
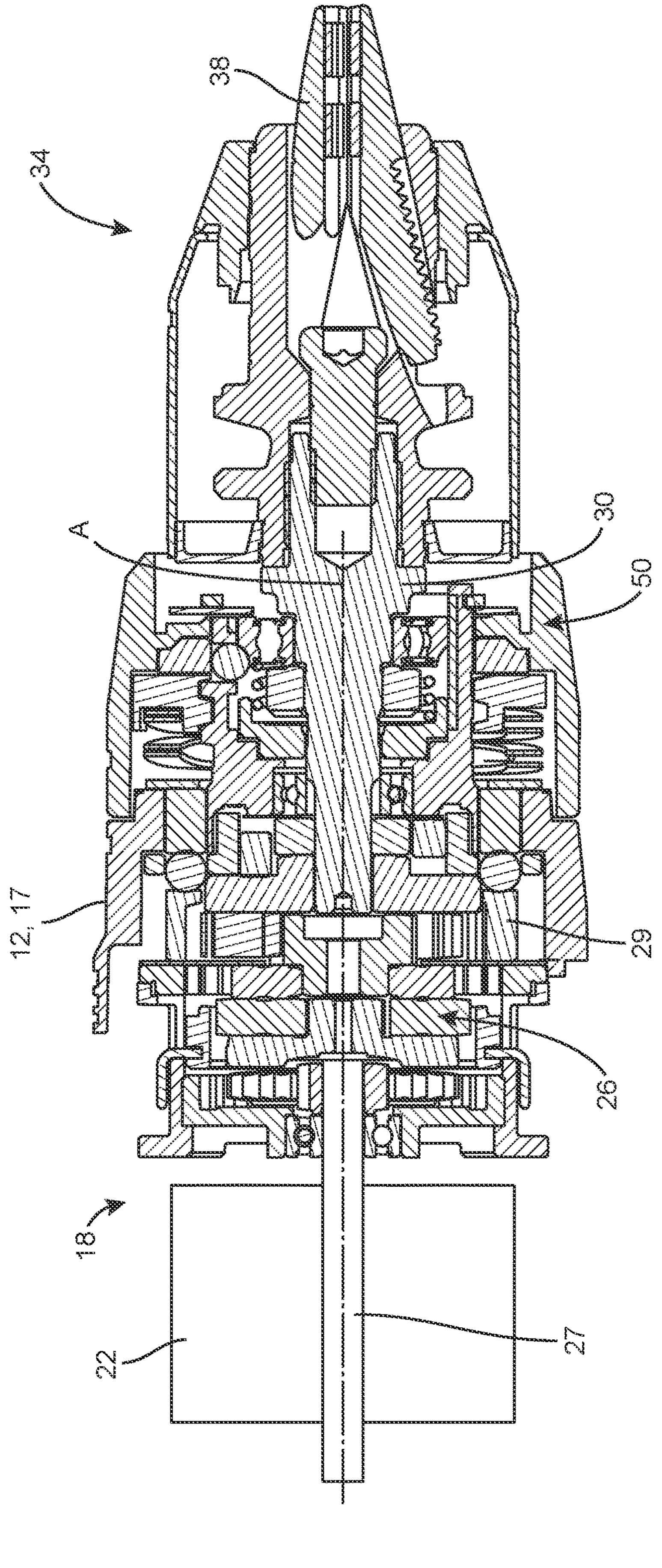
FIG. 2 is an enlarged cross-sectional view of a portion of the rotary power tool of FIG. 1.

Referring to FIG. 2, a drive mechanism 18 is disposed within the housing 12 and includes an electric motor 22 supported within the motor housing portion 14 and a transmission 26 coupled to an output shaft 27 of the electric motor 22 and supported at least partially within the gear case 17. In the illustrated embodiment, the transmission 26 is a multi-speed planetary transmission, which is shiftable to provide the power tool 10 with different output speeds (e.g., low-speed setting, a high-speed setting, and optionally one or more intermediate-speed settings). In other embodiments, other types of transmissions may be used.

With continued reference to FIG. 2, the illustrated transmission 26 includes an output 29 (i.e., a last stage ring gear, which in some embodiments may be a last stage carrier or other rotational output). The output 29 of the transmission 26 is operatively coupled to the spindle 30 via a clutch assembly 50, such that torque may be transferred from the output 29 to the spindle 30 to rotate the spindle 30 about a rotational axis A. The clutch assembly 50 selectively limits the torque transfer from the output 29 to the spindle 30. As previously described, in some embodiments, the transmission 26 may be shiftable between at least a low-speed setting and a high-speed setting. In some such embodiments, the clutch assembly 50 may be bypassed when the transmission 26 is in the high-speed setting. In the illustrated embodiment, the rotational axis A of the spindle 30 is coaxial with the motor output shaft 27; but, the motor output shaft 27 may be oriented parallel or perpendicular to the rotational axis A of the spindle 30 in other embodiments.

Figure 3:
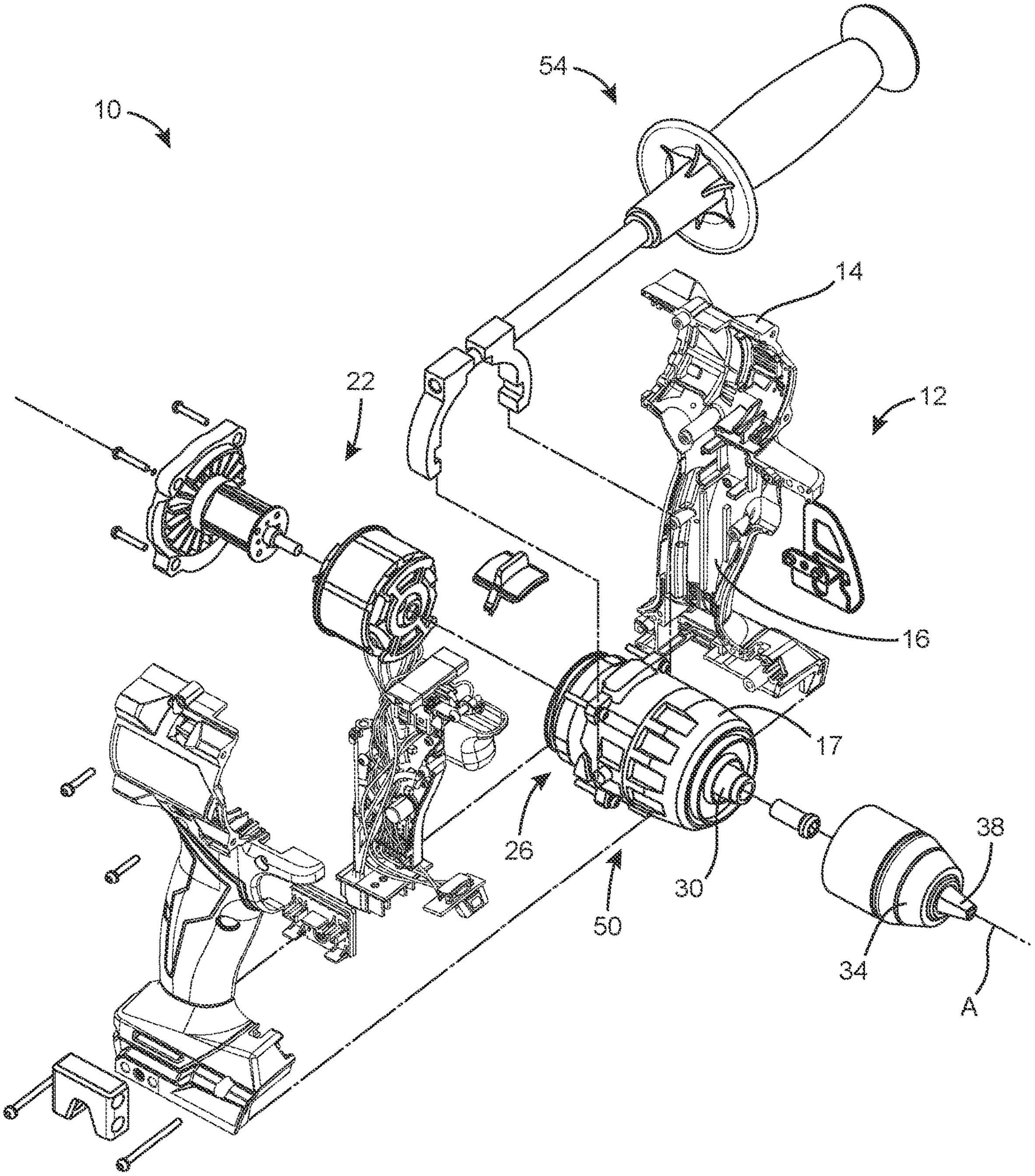
FIG. 3 is an exploded view of the power tool of FIG. 1.

With reference to FIGS. 2 and 3, the illustrated drive mechanism 18 further includes a chuck 34 located at an end of the spindle 30 opposite the transmission 26 and coupled for co-rotation with the spindle 30. The chuck 34 includes a plurality of jaws 38 configured to support a working tool bit (e.g., a drill bit, screwdriver bit, or the like; not shown). Torque is transmitted from the electric motor 22 through the transmission 26 and spindle 30 to the chuck 34 to be imparted on a workpiece.

The power tool 10 further includes an accessory, such as an auxiliary handle 54 (shown in FIGS. 1 and 3) that is removably coupled to the housing 12, and more specifically, in the illustrated embodiment, to the gear case 17. The illustrated auxiliary handle 54 extends in a direction generally perpendicular to the rotational axis A, but the auxiliary handle 54 may extend from the housing 14 in any direction relative to the rotational axis A in other embodiments. Auxiliary handles 54 are generally known in the art to provide a user an additional support member to hold the power tool 10 during high-torque operations and may be required by safety regulations for power tools with torque output above a certain threshold. However, for lower-torque operations, the user may not need the auxiliary handle 54. In these situations, the auxiliary handle 54 may provide unnecessary bulk to a power tool 10, which may interfere with operation of the power tool 10, affect the balance of the power tool 10, etc. As described in greater detail below, the power tool 10 is configured to vary a maximum torque output of the power tool 10 based on whether the auxiliary handle 54 is coupled to the power tool 10 and/or whether the auxiliary handle 54 is being gripped by the user. As such, the power tool 10 is able to provide a higher maximum torque output when the auxiliary handle 54 is in place, and a lower maximum torque output when the auxiliary handle 54 is removed, thereby abiding by safety regulations while still providing the operator with the option to use or remove the auxiliary handle 54.

Figure 4:
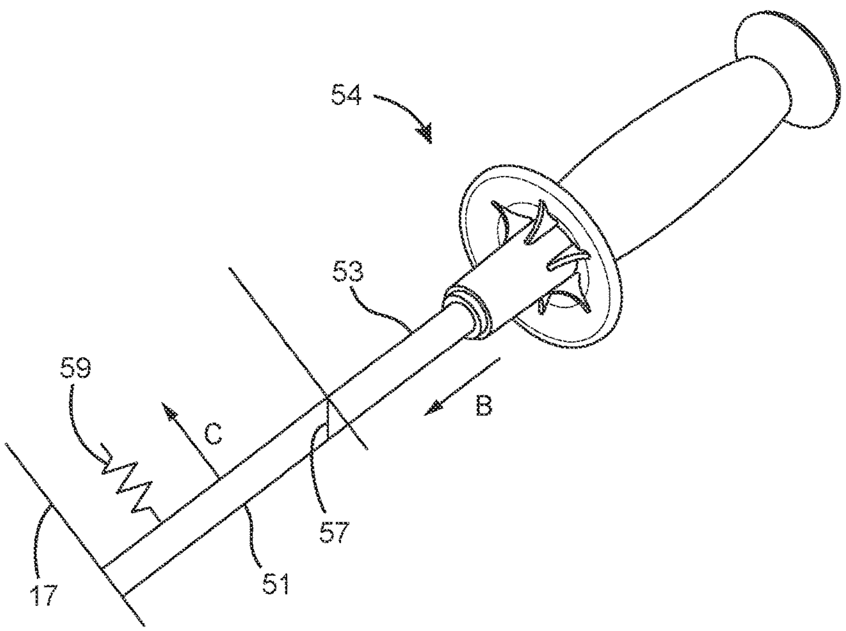
FIG. 4 is a perspective view of an accessory in the form of an auxiliary handle according to one embodiment and usable with the power tool of FIG. 1.

Referring to FIG. 4, in some embodiments, a gear 51 (e.g., a ring gear) within the transmission 26 is movable in response to the auxiliary handle 54 being coupled to or removed from the gear case 17. For example, the illustrated gear 51 includes a cam surface 57 engageable with a shaft portion 53 of the auxiliary handle 54. As such, when the auxiliary handle 54 is coupled to the gear case 17 in the direction of arrow B, the shaft portion 53 engages the cam surface 57 to shift the gear 51 in the direction of arrow C, against the force of a biasing member 59, which may include one or more coil springs, wave springs, spring washers, or the like.

The transmission 26 is configured such that, when the auxiliary handle 54 is not coupled to the gear case 17, the transmission 26 is operable in a first or low-torque mode—corresponding with an initial position of the gear 51. In the first mode, the power tool 10 will operate at a first maximum torque output. When the auxiliary handle 54 is securely coupled to the gear case 17, the transmission 26 is operable in a second or high-torque mode—corresponding with a shifted position of the gear 51—and the power tool 10 will operate at a second maximum torque output. The second maximum torque output is greater than the first maximum torque output. The biasing member 59 restores the gear 51 to its initial position when the auxiliary handle 54 is removed from the gear case 17.

In other embodiments, other methods may be employed for adjusting the torque output in response to the auxiliary handle 54 being coupled to or removed from the gear case 17. For example, current delivered to the motor 22 may be adjusted. In yet other embodiments, one or more pivoting linkages, spring arms, or the like may be used to shift the gear 51 between the initial position and the shifted position. In yet other embodiments, an electromechanical actuator, such as a solenoid or a small motor, may be used to shift the gear 51 in response to the auxiliary handle 54 being coupled to or removed from the gear case 17. In yet other embodiments, a pulse-width modulation (PWM) signal to the motor 22 may be altered. In yet other embodiments, communication parameters of the motor 22 may be adjusted. In yet other embodiments, field weakening parameters of the motor 22 may be adjusted. In yet other embodiments, an electrical or a mechanical clutch may be adjusted. Furthermore, although the auxiliary handle 54 is described as being couplable to the gear case 17, it should be understood that the auxiliary handle 54 may be coupled to other parts of the housing 12 of the power tool 10 in other embodiments. In some embodiments, the power tool 10 may include a lockout mechanism keyed to the auxiliary handle 54 to prevent a user from bypassing the torque adjustment by using/inserting an object other than the auxiliary handle 54.

Figure 5:
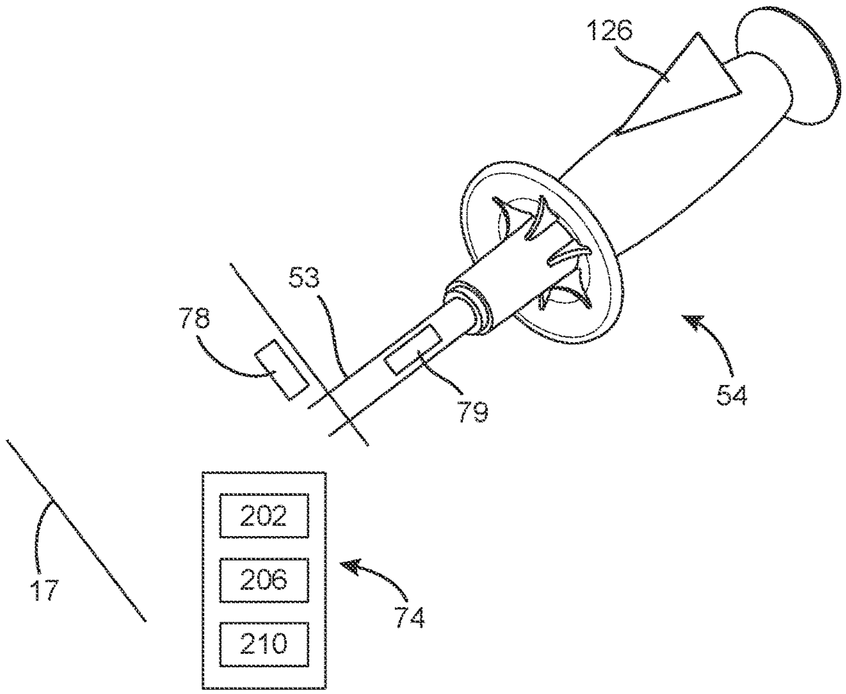
FIG. 5 is a perspective view of an accessory in the form of an auxiliary handle according to another embodiment and usable with the power tool of FIG. 1.

With reference to FIG. 5, in some embodiments, the power tool 10 includes a controller 74 and a sensor 78 (also referred to as a first sensor 78) that determine whether the auxiliary handle 54 is coupled to the power tool 10. The illustrated controller 74 includes a plurality of electrical and electronic components that may provide power, operational control, and protection to other components and modules within the controller 74 and the power tool 10. For example, the controller 74 may include, among other things, an electronic processor 202 (e.g., a programmable microprocessor, microcontroller, or similar device), non-transitory, machine-readable memory 206, and an input/output interface 210. The electronic processor 202 is communicatively coupled to the memory 206 and configured to retrieve from memory and execute, among other things, instructions related to the control processes and methods described herein. In other embodiments, the controller 74 includes additional, fewer, or different components.

The sensor 78 is located on or within the housing 12 (and more specifically, the gear case 17) of the power tool, but it may alternatively be located within the auxiliary handle 54. In the illustrated embodiment, the sensor 78 detects if the auxiliary handle 54 is coupled to the gear case 17 by detecting a tag 79 on the auxiliary handle 54. The controller 74 is communicatively coupled to the sensor 78 (via the input/output interface 210). If the sensor 78 detects the tag 79, the controller 74 will communicate with the drive mechanism 18 (via the input/output interface 210) to operate at the higher maximum torque output. If the sensor 78 does not detect the tag 79, the controller 74 will communicate with the drive mechanism 18 to operate at the lower maximum torque level. The controller 74 may continuously or periodically monitor the sensor 78.

The tag 79 may be an NFC tag, an RFID tag, or the like, capable of wirelessly communicating the presence of the auxiliary handle 54 to the sensor 78. In other embodiments, the tag 79 may include a bar code or other identifying symbol, and the sensor 78 may include an optical reader. In yet other embodiments, the sensor 78 may detect the physical presence of the auxiliary handle 54. For example, in such embodiments, the sensor 78 may include a switch engaged by the auxiliary handle 54 when the auxiliary handle 54 is coupled to the gear case 17. In other embodiments, the shaft portion 53 of the auxiliary handle 54 may be electrically conductive, and the sensor 78 may electrically detect when the auxiliary handle 54 is coupled to the gear case 17 (e.g., the shaft portion 53 may complete a circuit including the sensor 78). Other types of sensor 78 may also be used, including but not limited to a photovoltaic sensor or an inertial measuring unit (IMU).

Figure 7:
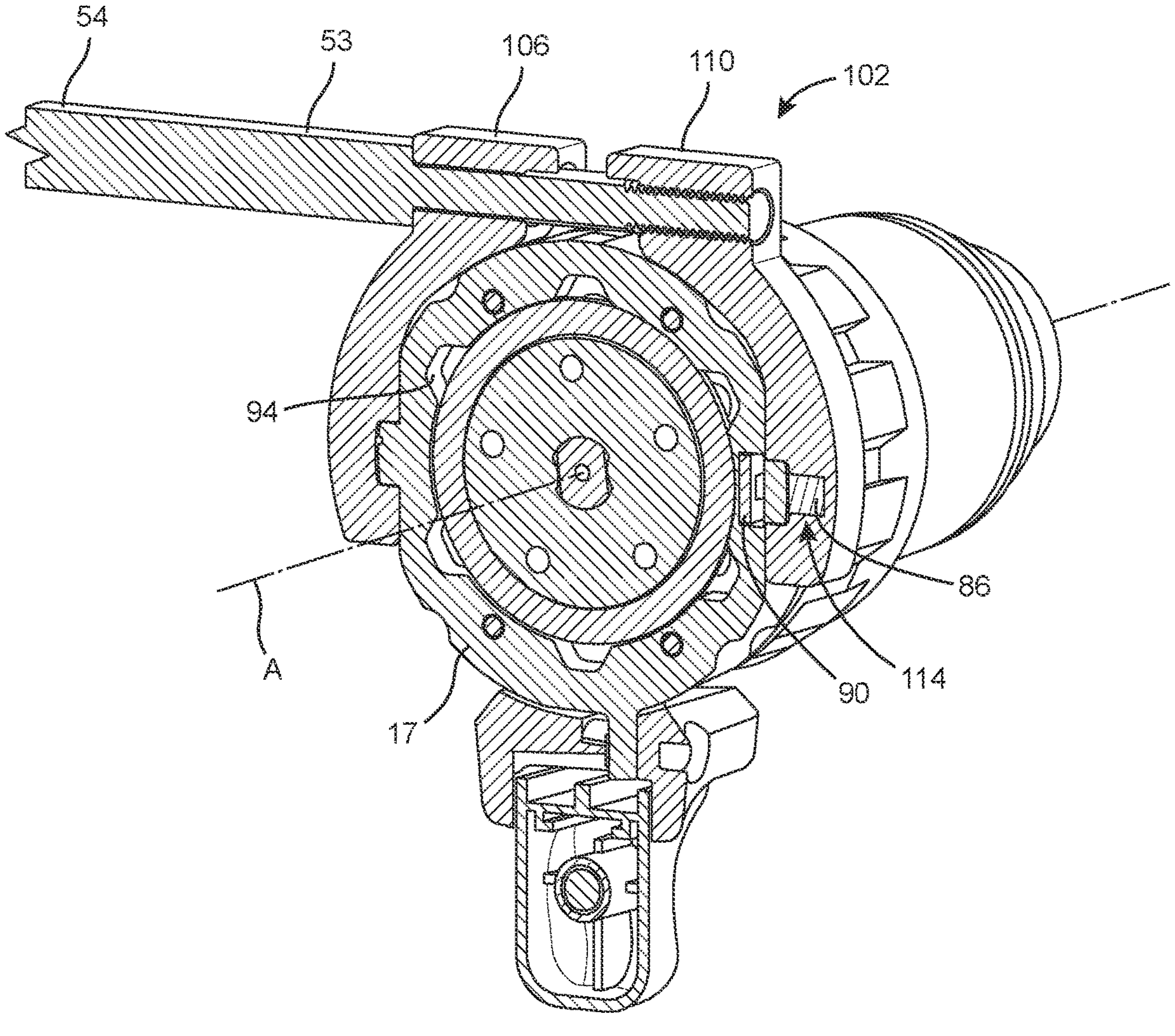
FIG. 7 is a cross-section view of a portion of the power tool of FIG. 1.
Figure 8:
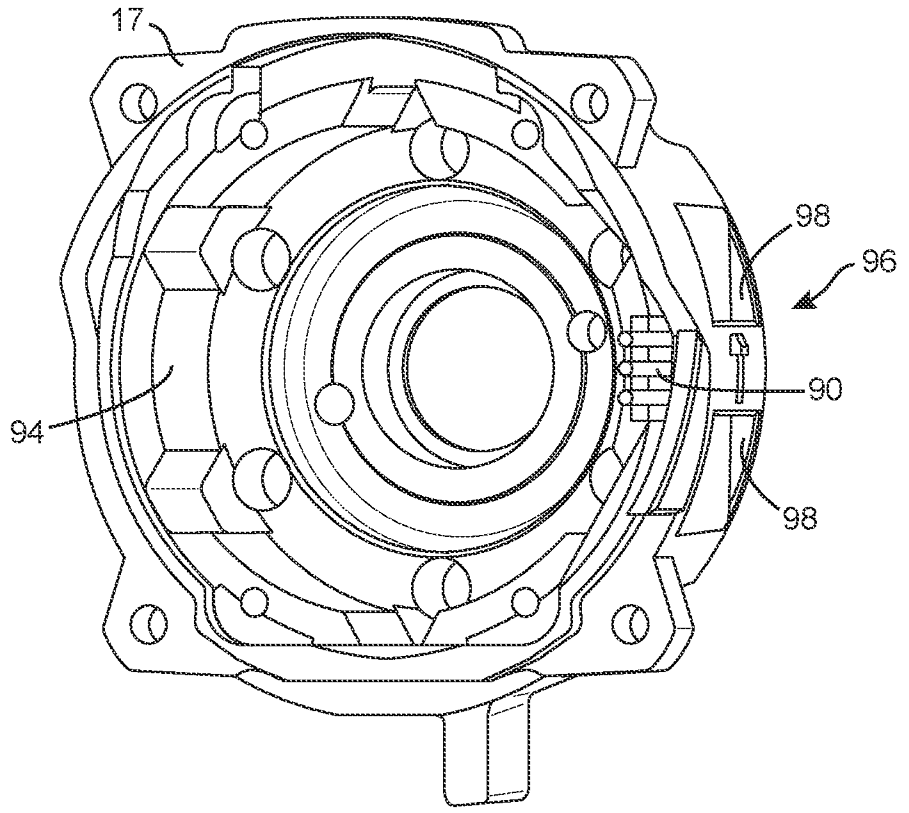
FIG. 8 is a perspective view of a gear case and a sensor of the power tool of FIG. 1.

For example, with reference to FIG. 7, in another embodiment, the power tool 10 includes a magnet 86 and a sensor 90 (also referred to as a third sensor 90) that determine whether the auxiliary handle 54 is coupled to the power tool 10. The sensor 90 can be a Hall effect sensor. The sensor 90 is positioned within the gear case 17 in the illustrated embodiment (e.g., coupled to an inner surface 94 of the gear case 17). As shown in FIG. 8, the illustrated sensor 90 is aligned with a receiving portion 96 of the gear case 17 between a pair of notches 98.

Figure 9:
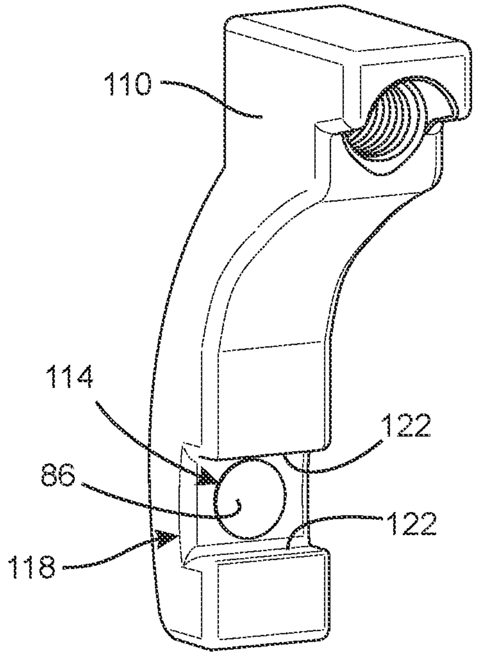
FIG. 9 is a perspective view of a mounting portion of an accessory and a magnet.

With reference to FIGS. 7-9, the auxiliary handle 54 includes a mount 102. The illustrated mount 102 includes a first mounting portion or jaw 106 and a second mounting portion or jaw 110. The first and second mounting portion 106, 110 couple to the gear case 17. The magnet 86 is received in a recess 114 in the mount 94. The recess 114 is positioned in a slot 118 of the second mounting portion 110. The slot 118 includes a pair of opposing sides 122. Each side 122 is received in a corresponding notch 98 to couple the mount 94 to the gear case 17. When the mount 94 is coupled to the gear case 17, the magnet 86 is aligned with the sensor 90. In the illustrated embodiment, a portion of the gear case 17 is positioned between the magnet 86 and the sensor 90; however, the magnet 86 may be mounted on an outer side of the gear case 17 in other embodiments.

The sensor 90 detects a magnetic field produced by the magnet 86 when the mount 102 is coupled to the gear case 17. As such, the sensor 90 sends a signal to the controller 74 when the sensor 90 detects the magnetic field of the magnet 86. The controller 74 may then, for example, shift the transmission 26 (shown in FIG. 2) to the high-torque mode. The sensor 90 may send no signal or send a second signal to the controller 74 when the sensor 90 does not detect the magnetic field of the magnet 86. The controller 74 may then, for example, shift the transmission 26 (shown in FIG. 2) to the low-torque mode. In some embodiments, the sensor 90 may be located on the auxiliary handle 54, and the magnet 86 may be located on the gear case 17.

In some embodiments, the auxiliary handle 54 may be a telescoping or multi-segment auxiliary handle, adjustable between a plurality of different lengths. In such embodiments, the sensor 78 may detect if the auxiliary handle 54 is set to a first, retracted length, a second, extended length, or optionally one or more intermediate lengths between the first length and the second length. This may be done using multiple tags 79 spaced along the length of the shaft portion 53, by determining a strength of a signal from the tag 79, or any other suitable sensing techniques, such as an ultrasonic sensor, or the sensors described above. The controller 74 may then control the drive mechanism 18 to operate at different torque levels based on the set length of the auxiliary handle 54. For example, if the sensor 78 detects the auxiliary handle 54 is at the retracted length, the controller 74 may operate the drive mechanism 18 at the second maximum output torque level. If the sensor 78 detects the auxiliary handle 54 is set at the extended length, the controller 74 may operate the drive mechanism 18 at a third, even higher maximum output torque level. Thus, the controller 74 may adjust the maximum output torque of the tool based on the length of the auxiliary handle 54.

Figure 6:
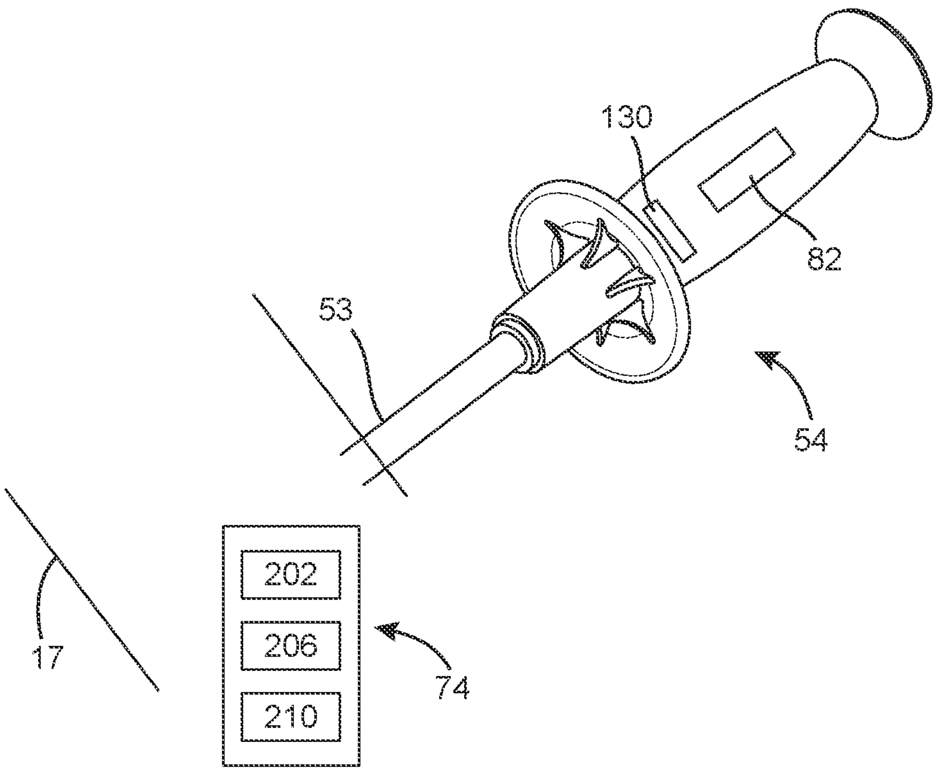
FIG. 6 is a perspective view of an accessory in the form of an auxiliary handle according to another embodiment and usable with the power tool of FIG. 1.

In some embodiments, and with reference to FIGS. 5 and 6, the auxiliary handle 54 may include a user presence sensor (i.e., a second sensor) in the form of an actuator 126 (FIG. 5) or a contact sensor 82 (FIG. 6). The actuator 126 may be a button, a switch, lever, or the like. The actuator 126 may communicate with the controller 74 to indicate the presence or absence of the auxiliary handle 54, as well as whether the auxiliary handle 54 is being gripped by an operator of the power tool 10. In such embodiments, when the actuator 126 is actuated, the controller 74 may operate the drive mechanism 18 at the higher maximum output torque level and at the lower maximum output torque level when the actuator 126 is not actuated. In yet other embodiments, the presence, absence, or length of the auxiliary handle 54 may be used to set the maximum output torque of the power tool 10, and the actuator 126 may act as a safety switch, such that the drive mechanism 18 may only be operated while the actuator 126 is actuated. In some embodiments, the auxiliary handle 54 may include a plurality of actuators 126 to allow the user to switch between a plurality of torque levels.

With reference to FIG. 6, the contact sensor 82 detects whether a user is contacting the auxiliary handle 54. The illustrated sensor 82 is positioned on or within the auxiliary handle 54. The sensor 82 can be, for example, a capacitive sensor able to detect a change in capacitance when the user contacts the auxiliary handle 54, thereby detecting user contact. In such embodiments, when the user contact is detected, the controller 74 may operate the drive mechanism 18 at the higher maximum output torque level and at the lower maximum output torque level when user contact is not detected. In yet other embodiments, the presence or absence of user contact may be used to set the maximum output torque of the power tool 10, and the contact sensor 82 may act as a safety switch, such that the drive mechanism 18 may only be operated while the portion of the auxiliary handle 54 including the contact sensor 82 is grasped by the user. In some embodiments, the controller 74 can shut down the power tool 10 when the sensor 82 does not detect the user contact. Additionally, or alternatively, the contact sensor 82 can be used to adjust an operational direction of the power tool 10. For example, the motor 22 may rotate the output shaft 27 in a first direction when the sensor 82 detects user contact. The motor 22 may then rotate the output shaft 27 in a second direction opposite the first direction when the sensor 82 does not detect user contact. In some embodiments, the controller 74 may implement machine learning to control the maximum output torque and/or other operational parameters of the power tool 10 based on use patterns of the power tool 10.

In some embodiments, an indicator (e.g., an LED 130 (shown in FIG. 6)) can indicate a state of the power tool 10 (e.g., by changing colors, change blinking rates, etc.). In a first non-limiting example, the LED 130 may change colors based on whether the sensor 82 (shown in FIG. 6) detects user contact. For example, the LED 130 may be green when the sensor 82 detects user contact, and the LED 130 may be red when the sensor 82 does not detect contact. In another non-limiting example, the LED 130 may change colors based on the actuator 126 (shown in FIG. 5). For example, the LED 130 may be green when the actuator 126 is actuated, and the LED 130 may be red when the actuator 126 is not actuated.

In some embodiments, the auxiliary handle 54 may include a battery (not shown), such as a removable power tool battery pack. In some embodiments, the battery associated with the auxiliary handle 54 may be interchangeable with the battery that interfaces with the battery receptacle 19 of the power tool 10. In yet other embodiments, the battery associated with the auxiliary handle 54 may have a different voltage and/or form factor. The auxiliary handle battery may provide additional power to the power tool 10, which may be used to increase the torque output of the power tool 10 and/or provide the power tool 10 with additional battery life. In yet other embodiments, the battery on the auxiliary handle 54 may additionally or alternatively power electronic components of the auxiliary handle 54.

Although the invention has been described in detail with reference to certain preferred embodiments, variations and modifications exist within the scope and spirit of one or more independent aspects of the invention as described.

Various features and aspects of the invention are set forth in the following claims.

What is claimed is:

1. A power tool comprising:
- a housing;
- a drive mechanism supported within the housing;
- a spindle operatively coupled to an output of the drive mechanism such that torque from the drive mechanism rotates the spindle about an axis;
- an auxiliary handle removably coupled to the housing and having a length adjustable between a retracted length and an extended length;
- a sensor supported by the auxiliary handle; and
- a controller in communication with the sensor, the controller configured to determine if the auxiliary handle is set to the retracted length or the extended length based on feedback from the sensor,
- wherein the controller is configured to control the drive mechanism to adjust a maximum output torque of the drive mechanism based on the length of the auxiliary handle.

2. The power tool of claim 1, wherein the controller is configured to control the drive mechanism to supply up to a first maximum torque when the controller determines the auxiliary handle is set to the retracted length and to supply up to a second maximum torque greater than the first maximum torque when the controller determines the auxiliary handle is set to the extended length.

3. The power tool of claim 1, wherein the controller is configured to determine whether the auxiliary handle is coupled to or not coupled to the housing.

4. The power tool of claim 3, wherein the controller is configured to control the drive mechanism to supply up to a first maximum torque when the controller determines the auxiliary handle is not coupled to the housing and up to a second maximum torque greater than the first maximum torque when the controller determines the auxiliary handle is coupled to the housing and set to the retracted length.

5. The power tool of claim 4, wherein the controller is configured to control the drive mechanism to supply up to a third maximum torque greater than the second maximum torque when the controller determines the auxiliary handle is coupled to the housing and set to the extended length.

6. The power tool of claim 1, further comprising a user presence sensor in communication with the controller and configured to detect when a user is grasping the auxiliary handle.

7. The power tool of claim 6, further comprising an indicator configured to change colors when the user presence sensor detects that the user is grasping the auxiliary handle.

8. The power tool of claim 6, wherein the user presence sensor includes a capacitive sensor.

9. The power tool of claim 6, wherein the user presence sensor includes an actuator.

10. The power tool of claim 1, wherein the auxiliary handle is adjustable to an intermediate length between the retracted length and the extended length.

11. A power tool comprising:
- a housing;
- a drive mechanism supported within the housing and including a shiftable gear;
- a spindle operatively coupled to an output of the drive mechanism such that torque from the drive mechanism rotates the spindle about an axis; and
- an accessory removably coupled to the housing,
- wherein the accessory includes a portion configured to engage the shiftable gear to move the shiftable gear from a first position to a second position in response to the accessory being coupled to the housing.

12. The power tool of claim 11, wherein the accessory is an auxiliary handle.

13. The power tool of claim 11, wherein the accessory includes a shaft portion insertable into the housing to engage the shiftable gear.

14. The power tool of claim 13, wherein the shiftable gear includes a cam engageable with the shaft portion to move the shiftable gear.

15. The power tool of claim 11, wherein the shiftable gear is biased towards the first position.

16. The power tool of claim 11, wherein the drive mechanism is operable in a low-torque mode when the shiftable gear is in the first position, and wherein the drive mechanism is operable in a high-torque mode when the shiftable gear is in the second position.

17. A power tool comprising:
- a housing;
- a drive mechanism supported within the housing;
- a spindle operatively coupled to an output of the drive mechanism such that torque from the drive mechanism rotates the spindle about an axis;
- an auxiliary handle removably coupled to the housing and including a sensor;
- a controller configured to control an operating direction of the drive mechanism based on input from the sensor.

18. The power tool of claim 17, wherein the controller is configured to control the drive mechanism to rotate in a first direction when the sensor detects contact and to rotate in a second direction opposite the first direction when the sensor does not detect contact.

19. The power tool of claim 18, further comprising an indicator configured to indicate when the sensor detects contact.

20. The power tool of claim 19, wherein the indicator is configured to change from a first color when the sensor detects contact to a second color when the sensor does not detect contact.

* * * * *